Oct. 15, 1929.  D. C. KLAUSMEYER  1,731,670
SIMPLIFIED MOUNT FOR CONCENTRICALLY SUSPENDING SLEEVES
Filed April 22, 1925
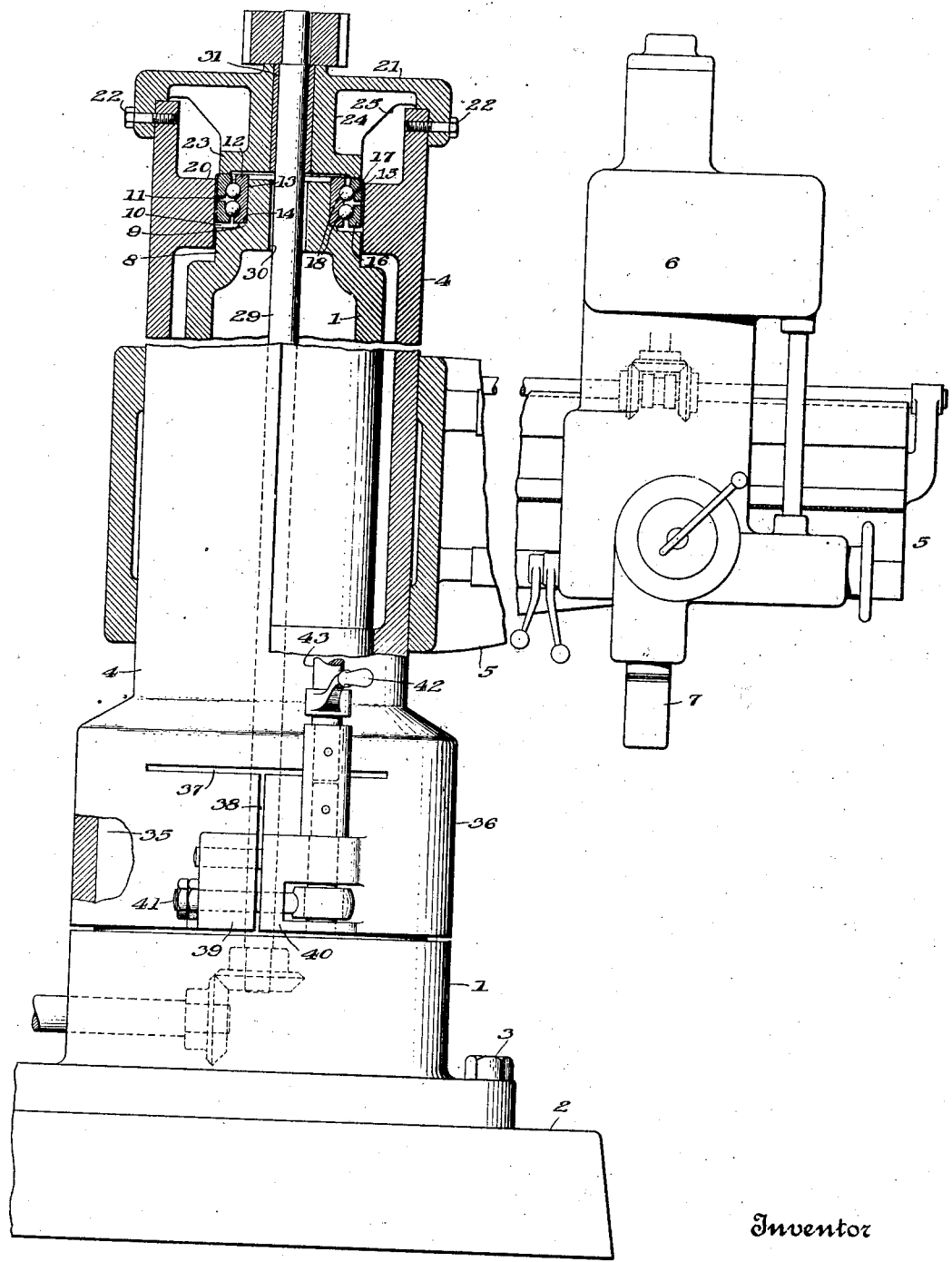
Inventor
David C. Klausmeyer
By Attorney
Albert F. Nathan Patented Oct. 15, 1929

1,731,670

UNITED STATES PATENT OFFICE

DAVID C. KLAUSMEYER, OF CINCINNATI, OHIO, ASSIGNOR TO THE CINCINNATI BICKFORD TOOL COMPANY OF OAKLEY, CINCINNATI, OHIO, A CORPORATION OF OHIO

SIMPLIFIED MOUNT FOR CONCENTRICALLY SUSPENDING SLEEVES

Application filed April 22, 1925. Serial No. 25,162.

My invention is concerned with a radial drilling machine and is chiefly concerned with the supporting of the radial arm on the stationary post or column.

In many radial drilling machines, as now constructed, a rotatable sleeve member is mounted on a stationary post or column and a radial arm is mounted on the sleeve member. The radial arm carries a suitable drill head which in turn carries a drill spindle. The sleeve member is rotatably adjustable on the stationary post and the radial arm is vertically adjustable on the sleeve member. The post is provided with bearings for maintaining the sleeve member concentric with respect to the post and with bearings for supporting the weight of the sleeve member and the parts carried thereby. Many of the machines heretofore constructed have a head member secured to the top of the post. The head member secured to the top of the post is provided with two separate sets of ball bearings. One of the ball bearings is in the nature of a radial bearing and the other ball bearing is in the nature of a thrust bearing. The thrust ball bearing, which is seated in said member, engages a cap secured to the sleeve member. Such thrust bearing serves to support the weight of the sleeve, the radial arm, and the drill head. The radial bearing, which is seated in the head member at the top of the post, engages a separate collar secured to the sleeve member. Such radial bearing serves to maintain the sleeve member concentric with respect to the post and permits free rotation of the sleeve member about the post.

One of the principal objects of my invention is to provide a simplified and improved means for supporting the sleeve member on the post or column. The post in a drilling machine constructed in accordance with my invention is provided with an integral reduced top portion which supports a single combined thrust and radial ball bearing. The reduced top portion formed on the post, constructed in accordance with my invention, takes the place of the separate head member which has been secured to the top of the post in the machines heretofore constructed. Moreover a single ball bearing is fitted to the reduced top portion of the post. Such single ball bearing is in the nature of a combined thrust and radial bearing and not only supports the weight of the sleeve member and the parts carried thereby but also maintains the sleeve member concentric with respect to the post. A cap member, which is secured to the sleeve, is provided with an annular ring projection for engaging the ball bearing on the post to support the weight of the sleeve member and the parts carried thereby. An annular flange, which projects from the sleeve member, engages the periphery of the ball bearing on the top of the post to permit a free rotation of the sleeve about the post and to maintain the sleeve member concentric with respect to the post. In the above construction, it will be noted no separate head member is provided on the top of the post, no separate collar is provided which is attached to the sleeve for engaging a radial bearing and moreover only one bearing is necessary in place of the two bearings heretofore provided in like structures.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

The single figure in the accompanying drawing is an elevational view partially in section of a radial drilling machine constructed in accordance with my invention.

Referring to the drawings, a post or column 1 is secured to a base 2 by means of bolts 3, one only of which is illustrated on the drawing. A sleeve member 4 is supported on and surrounds the post 1. The sleeve member 4 carries a radial arm 5 of any conventional construction which in turn carries a suitable drill head 6. The drill head 6 is moved along the radial arm 5 in any conventional manner and is provided with a drill spindle 7 carrying a drilling tool (not shown). The construction of the radial arm and the drill head mounted thereon is not specifically related to my invention. Accordingly it is deemed unnecessary to specifically describe the radial arm and the drill head shown in the drawing. My invention is concerned chiefly with the mechanism for supporting the sleeve member 4 which carries the radial arm 5 and the drill head 6.

Near the upper end of the post 1 is formed a reduced portion 8 and a still further reduced portion or shoulder 9 is formed above the portion 8. The reduced portion or shoulder 9 provides a seat for a combined thrust and radial ball bearing 11. The ball bearing 11 comprises an inner race member 12 which is seated on the reduced portion 9 of the post 1 so as to withstand forces operating not only radially with respect to the post but also axially with respect to the post. In order to withstand the radial thrust with respect to the post, the inner race member 12 is fitted to a cylindrical surface 13 formed on the top of the post. The lower part of the race member 12 rests upon a seat 14 on the top of the post in order to insure it against any axial movement with respect to the post. Two outer race members 15 and 16, which are connected together by a band 17, are provided for supporting the sleeve member 4. In the ball bearing 11 shown in the drawing, two sets of balls 18 are provided between the inner and the outer race members.

An annular flange or collar 20, which projects from the inside of the sleeve member 4, engages the band 17 around the outer race members 15 and 16 for maintaining the sleeve member concentric with respect to the post and for insuring the free rotation of the sleeve member about the post. Sufficient clearance is provided between the reduced portion 8 of the post and the annular projection 20 in order to insure engagement only between the ball bearing and the annular projection 20. A cap member 21, which is secured to the top of the sleeve 4 by means of bolts 22, is provided with an annular ring or flange 23 which engages the top of the outer race member 15. The annular ring 23 is secured to the cap by means of a hub portion 24 and ribs 25. It will be noted that the radial arm 5 and the drill head 6 are directly mounted on the sleeve member 4 and that the complete weight of the sleeve member and all parts carried thereby is supported directly on the ball bearing 11. Thus, the ball bearing 11 not only serves as a thrust bearing for carrying the weight of the sleeve and all parts mounted thereon but also serves as a radial bearing for maintaining the sleeve member concentric with respect to the post or column.

A main driving shaft 29 is connected to a suitable source of power at the bottom of the post 1 and projects through an opening 30 formed in the top portion of the post and through the hub portion 24 of the cap 21. Preferably, a bushing 31 is provided for the main driving shaft 29 in the hub 24. The main driving shaft 29 supplies power for operating the radial drill in the usual manner.

The lower portion 35 of the post 1 is enlarged and a clamping portion 36 of the sleeve member 4 is fitted to such enlarged portion 35 of the post. The portion 36 of the sleeve has a transverse slot 37 formed therein. A second slot 38 is formed in the portion 36 of the sleeve perpendicular to the slot 37. Such slots 37 and 38 permit the clamping of the sleeve to the post in any set position. Preferably lugs 39 and 40 project from the sleeve member on opposite sides of the slots 38, as shown in the drawing. A bolt 41 projects through such lugs 39 and 40 and is operated by an eccentric member for firmly clamping the portion 36 of the sleeve against the portion 35 of the post. The eccentric member is operated by a hand lever 41 which is mounted on a shaft 43. Inasmuch as such clamping means is well known a further description thereof is deemed unnecessary.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a radial drill, the combination comprising a sleeve; a post for supporting said sleeve and having a reduced top portion formed integral therewith; a combined radial and thrust ball bearing mounted on the top portion of said post, said bearing comprising an inner race member mounted on the post, two outer race members, and rows of balls between the race members; a cap secured to the top of the sleeve and engaging one of the outer race members for supporting the sleeve and the parts carried thereby; and a projection from the sleeve member for engaging the outer race members to maintain the sleeve member concentric with respect to said post.

2. A radial drill combining a post; a sleeve adapted to carry a drill arm; and means for rotatably supporting said sleeve on said post comprising a reduced portion formed on the upper end of said post, an inner race bearing member mounted thereon, two vertically spaced outer race members substantially the same diameters circumscribing said inner race bearing member, anti-friction bearing elements between said outer race members and said inner race member, a portion rigid with the upper end of the sleeve engaging one of said outer race members for supporting the sleeve vertically, and means projecting inwardly from said sleeve and engaging said outer race members for supporting the sleeve radially.

In witness whereof, I have hereunto subscribed my name.

DAVID C. KLAUSMEYER.